United States Patent
Crombez et al.

(10) Patent No.: US 9,709,661 B2
(45) Date of Patent: Jul. 18, 2017

(54) LOCALISATION SYSTEM

(71) Applicant: Televic Healthcare NV, Izegem (BE)

(72) Inventors: Pieter Crombez, Torhout (BE); John Gesquiere, Poperinge (BE)

(73) Assignee: Televic Healthcare NV, Izegem (BE)

( * ) Notice: Subject to any disclaimer, the term of this patent is extended or adjusted under 35 U.S.C. 154(b) by 0 days.

(21) Appl. No.: 15/107,798

(22) PCT Filed: Jan. 5, 2015

(86) PCT No.: PCT/EP2015/050071
§ 371 (c)(1),
(2) Date: Jun. 23, 2016

(87) PCT Pub. No.: WO2015/097316
PCT Pub. Date: Jul. 2, 2015

(65) Prior Publication Data
US 2016/0334496 A1    Nov. 17, 2016

(30) Foreign Application Priority Data

Dec. 24, 2013  (EP) .................................... 13199601

(51) Int. Cl.
*G01S 3/02*     (2006.01)
*G01S 5/02*     (2010.01)
(Continued)

(52) U.S. Cl.
CPC .......... *G01S 5/0263* (2013.01); *G01S 5/0252* (2013.01); *G01S 5/183* (2013.01); *G01V 15/00* (2013.01);
(Continued)

(58) Field of Classification Search
CPC ........ G01S 5/02; G01S 5/0263; G01S 5/0252; G01S 5/18; G01S 5/183; G01S 5/0027;
(Continued)

(56) References Cited

U.S. PATENT DOCUMENTS 5,917,425 A     6/1999  Crimmins et al.
7,295,132 B2*  11/2007  Steiner ..................... G01C 3/26
                                                      235/383
(Continued)

FOREIGN PATENT DOCUMENTS

BE    EP-2469298 A1 *  6/2012  ............. G01S 13/87
EP       2565674 A1    3/2013
(Continued)

OTHER PUBLICATIONS

International Preliminary Report on Patentability mailed Jul. 7, 2016 from Application No. PCT/EP2015/050071 filed Jan. 5, 2015.
(Continued)

*Primary Examiner* — Chuong P Nguyen
(74) *Attorney, Agent, or Firm* — Jacobsen IP Law; Krista S. Jacobsen

(57) ABSTRACT

The invention pertains to a method and system for determining a location of an identification tag (100) in a monitored area. The method comprises using a plurality of beacons (200) to broadcast (2010) beacon messages comprising an identification element relating to the originating beacon; receiving (2020) at a first set of beacons a localization message from an identification tag (100), the tag having received (1010) a beacon message, extracted (1020) the identification element from the received beacon message, and transmitted (1030) information related to the identification element as part of the localization message; performing (3010) a first level of localization of the tag on the basis of characteristics of the respective copies of the localization message received at the first set of beacons; and performing (3020) a second level of localization of the tag on the basis of the information related to the identification element.

19 Claims, 2 Drawing Sheets

(51) Int. Cl.
*G01S 5/18* (2006.01)
*G01V 15/00* (2006.01)
*G01S 13/74* (2006.01)
*G06Q 10/06* (2012.01)
*G01S 1/02* (2010.01)
*G01S 1/72* (2006.01)

(52) U.S. Cl.
CPC . *G01S 1/02* (2013.01); *G01S 1/72* (2013.01); *G01S 5/0236* (2013.01); *G01S 13/74* (2013.01); *G06Q 10/06* (2013.01)

(58) Field of Classification Search
CPC ........ G01S 5/0036; G01S 13/02; G01S 13/74; G07C 9/00; G07C 9/00111; G01V 15/00
USPC ............ 342/363; 340/539.1, 539.13, 539.21, 340/5.81; 455/456.1
See application file for complete search history.

(56) References Cited

U.S. PATENT DOCUMENTS

| | | | |
|---|---|---|---|
| 7,489,242 B2* | 2/2009 | Hines | G08B 21/0227 340/568.1 |
| 7,541,942 B2* | 6/2009 | Cargonja | G07C 9/00111 235/384 |
| 7,751,829 B2* | 7/2010 | Masuoka | G01S 5/0294 455/41.2 |
| 7,768,392 B1 | 8/2010 | Brand et al. | |
| 7,830,250 B2* | 11/2010 | Huseth | G01S 5/14 340/500 |
| 7,899,006 B2 | 3/2011 | Boyd | |
| 8,139,945 B1* | 3/2012 | Amir | H04B 10/1149 340/8.1 |
| 8,548,490 B2* | 10/2013 | Wang | G01S 5/18 455/127.1 |
| 2002/0167417 A1 | 11/2002 | Welles et al. | |
| 2003/0030568 A1* | 2/2003 | Lastinger | G06K 7/0008 340/8.1 |
| 2006/0290519 A1* | 12/2006 | Boate | G07C 9/00111 340/573.4 |
| 2007/0139199 A1* | 6/2007 | Hanlon | G01S 5/02 340/572.1 |
| 2008/0100422 A1 | 5/2008 | Tuttle et al. | |
| 2008/0186233 A1* | 8/2008 | McCoy | G06Q 10/087 342/444 |
| 2008/0252426 A1 | 10/2008 | Lee et al. | |
| 2009/0273465 A1 | 11/2009 | Shamir et al. | |
| 2011/0057779 A1 | 3/2011 | Canard et al. | |
| 2013/0309964 A1 | 11/2013 | Hall et al. | |
| 2014/0361903 A1 | 12/2014 | Sawada | |
| 2016/0260301 A1* | 9/2016 | Miller | G08B 13/2417 |

FOREIGN PATENT DOCUMENTS

| | | |
|---|---|---|
| WO | 2007006085 A1 | 1/2007 |
| WO | 2013105589 A1 | 7/2013 |
| WO | 2013169612 A1 | 11/2013 |

OTHER PUBLICATIONS

Applicant's Demand for International Preliminary Examination (Chapter II PCT) submitted Oct. 8, 2015 from Application No. PCT/EP2015/050069 filed Jan. 5, 2015.
Extended European Search Report and European Search Report mailed May 23, 2014 from European Patent Application No. 13199600.1 filed Dec. 24, 2013.
Extended European Search Report and European Search Report mailed May 26, 2014 from European Patent Application No. 13199601.9 filed Dec. 24, 2013.
International Preliminary Report on Patentability mailed Dec. 8, 2015 from Application No. PCT/EP2015/050069 filed Jan. 5, 2015.
International Search Report and Written Opinion of the International Search Authority mailed May 19, 2015 from International Serial No. PCT/EP2015/050071 filed Jan. 5, 2015.
International Search Report and Written Opinion of the International Search Authority mailed Jun. 8, 2015 from International Serial No. PCT/EP2015/050069 filed Jan. 5, 2015.
Applicant's Reply to the Extended European Search Report and European Search Report mailed May 23, 2014, filed Jan. 4, 2016, from European Patent Application No. 13199600.1 filed Dec. 24, 2013.

* cited by examiner

LOCALISATION SYSTEM

FIELD OF THE INVENTION

The present invention relates to a wireless localisation system for movable objects or persons, such as a system to track the location of patients and/or assets in a facility such as a hospital, and corresponding methods.

BACKGROUND

WO 2004/051303 A1 discloses a method and a system for monitoring and position determination of objects and/or living beings within an area, such as, e.g. a room in a building or a road tunnel. The system comprises a plurality of identification tags equipped with an ultrasonic receiver and radio transmitter which is attached to the objects that have to be monitored. The identification tags receive ultrasonic signals whose arrival time they measure. This information together with the identification tags' ID code are transmitted by radio waves to a central unit which calculates the position of each of the identification tags.

It is a disadvantage of the known system that the processing that must be carried out at the identification tags is relatively complex, and that a large amount of data may have to be transmitted from the beacons to the tags, which in turn leads to a high energy consumption at the tags. It is an object of embodiments of the present invention to at least partially overcome these disadvantages.

SUMMARY OF THE INVENTION

According to an aspect of the present invention, there is provided a method for determining a location of an identification tag in a monitored area, the method comprising: using a plurality of beacons to broadcast beacon messages, each beacon message comprising an identification element relating to the respective beacon that broadcast the beacon message; receiving at a first set of beacons from among the plurality of beacons a localisation message from an identification tag, the tag having received a beacon message from among the plurality of beacon messages, extracted the identification element from the received beacon message, and transmitted information related to the identification element as part of the localisation message; performing a first level of localisation of the tag on the basis of characteristics of the respective copies of the localisation message received at the first set of beacons; and performing a second level of localisation of the tag on the basis of the information related to the identification element.

The invention is based inter alia on the insight of the inventors that by combining localisation based on the signal characteristics of the received localisation message (i.e., the tag message) with address based localisation, the localisation process can be made more efficient and more accurate. When an identification tag broadcasts its localisation message containing the identifier of a nearby (typically the nearest) beacon, the coarse localisation based on received signal characteristics will define the general zone in which the transmitting tag must be present. At the same time, the identification element contained in the localisation message identifies the individual beacon within said general zone, from which the beacon message received by the tag originated. Taking into account the presence of physical barriers to the propagation of beacon signals within the area to be monitored, the area can be considered as consisting of non-overlapping cells, and the above mentioned identification of a "general zone" may constitute the identification of the cell in which the identification tag is present.

In an embodiment of the method according to the present invention, the characteristics comprise the relative signal strengths of the respective copies of the localisation message received at the first set of beacons.

This embodiment uses the fact that the power intensity of signals transmitted by a point source in an open space, such as radio signals and acoustic signals, decreases with distance. The intensity decreases even more if absorbing or reflective barriers are present in the path between the transmitter and the receiver. Hence, the received signal strengths form a suitable characteristic to estimate relative distances between a transmitter and respective receivers. It is an advantage of this embodiment that it provides a very efficient and cost-effective way to perform the coarse localisation step.

In an embodiment of the method according to the present invention, the same identification elements are assigned to different beacons from among the plurality of beacons which are located at positions for which the respective ranges for receiving beacon messages do not overlap.

The words "located at positions" are intended to mean that the beacons remain at such positions for the duration of the localisation steps according to the method of the invention. In particular, the beacons may be semi-permanently or permanently located at their positions. In particular, the beacons may be semi-permanently or permanently attached to elements of a building, such as walls, ceilings, doorposts, doors, columns, and the like.

This embodiment is based on the insight of the inventors that the tag can be unambiguously located down to the individual beacon by means of the advertised beacon identifier, if that identifier is unique within the zone initially identified by the measurements of the received signal characteristics. Thus, by judiciously allocating identification elements (addresses) to the beacons, taking into account the physical layout of the area to be monitored and its division into cells, the total size of the required address space can be reduced. In particular, the beacon addresses will only have to be unique within the physical space in which the beacon messages can propagate, e.g. a single room or ward, because in any given space the tag would only be able to receive beacon messages from within that space.

In an embodiment of the method according to the present invention, the beacon message is transmitted as an ultrasound message.

Within building environments, ultrasound waves are almost completely blocked by walls (contrary to electromagnetic waves). Ultrasound waves are therefore a suitable signal type to obtain room-level localisation accuracy.

In an embodiment of the method according to the present invention, the localisation message is transmitted as a radio-frequency message.

Radio-frequency transmission can be used to efficiently cover a longer range than ultrasound transmission. Thus, the localisation message may be transmitted from the tag to a number of beacons, which are not necessarily in the same room as the tag.

In an embodiment, the method according to the present invention further comprises transmitting the information related to the identification element along with information related to the characteristics from the first set of beacons to a location calculation agent.

It is an advantage of this embodiment, that information about the received signal characteristics observed at different beacons is made available to a central unit, preferably part of a centralized management system, which processes the received information to obtain the desired location information. Thus, the processing at the individual beacons can be kept to a minimum, which keeps the cost of these beacons down.

In a particular embodiment, the transmitting occurs only at selected beacons from among the first set of beacons, the selected beacons being those beacons for which the identification element corresponds to the information related to the identification element.

While the localisation message is physically broadcast by the identification tag, there is no strict need for all beacons that receive it to relay it to the location calculation agent. In fact, the localisation process can be performed on the basis of the received signal characteristics observed at the beacons that match the identification element indicated by the localisation message alone. Thus, the beacons may treat the localisation message as a sort of "targeted broadcast" or "multicast" message, which they only relay if the advertised identification element corresponds to their own identification element (i.e., the "address" of the beacon).

According to an aspect of the present invention, there is provided a computer program product comprising code means configured to cause a processor to perform the method as described above.

According to an aspect of the present invention, there is provided a system comprising at least one identification tag and a plurality of beacons; wherein the plurality of beacons is configured to broadcast beacon messages, each beacon message comprising an identification element relating to the respective beacon that broadcast the beacon message; and wherein the at least one identification tag is adapted to: receive a beacon message from among the plurality of beacon messages, extract the identification element from the received beacon message, and transmit information related to the identification element as part of the localisation message; the system further comprising localisation logic configured to perform a first level of localisation of the tag on the basis of characteristics of the respective copies of the localisation message received at the first set of beacons; and to perform a second level of localisation of the tag on the basis of the information related to the identification element.

In an embodiment of the system according to the present invention, the characteristics comprise the relative signal strengths of the respective copies of the localisation message received at the first set of beacons.

In an embodiment of the system according to the present invention, the same identification elements are assigned to different beacons from among the plurality of beacons which are located at positions for which the respective ranges for receiving beacon messages do not overlap.

In an embodiment of the system according to the present invention, the plurality of beacons are adapted to transmit the beacon message as an ultrasound message.

In an embodiment of the system according to the present invention, the at least one identification tag is adapted to transmit the localisation message as a radio-frequency message.

In an embodiment, the system according to the present invention further comprises a location calculation agent, wherein the plurality of beacons is further configured to transmit the information related to the identification element along with information related to the characteristics to the location calculation agent.

The technical effects and advantages of embodiments of the computer program product and the system according to the present invention correspond mutatis mutandis to those of the corresponding embodiments of the method according to the invention.

According to an aspect of the present invention, there is provided a method for installing a system as described above, the method comprising: selecting beacon locations in an area to be monitored; grouping the selected beacon locations into cells such that beacon messages cannot cross cell boundaries; assigning beacon addresses to the selected beacon locations, wherein the beacon addresses are unique within the cells; determining for each one of the cells a minimum address field size required to transmit all beacon addresses occurring in the cell; and positioning beacons at the beacon locations, each one of the beacons being configured to transmit the respective beacon address associated with the beacon location at which it is positioned.

This installation methodology takes full advantage of the features of the present invention to keep the length of the address field in the beacon messages to a minimum, thus keeping communications short and optimally preserving the (battery) energy in the identification tag.

BRIEF DESCRIPTION OF THE FIGURES

These and other features and advantages of embodiments of the present invention will now be described in more detail with reference to the accompanying drawings, in which.

DETAILED DESCRIPTION OF EMBODIMENTS

Figure 1:
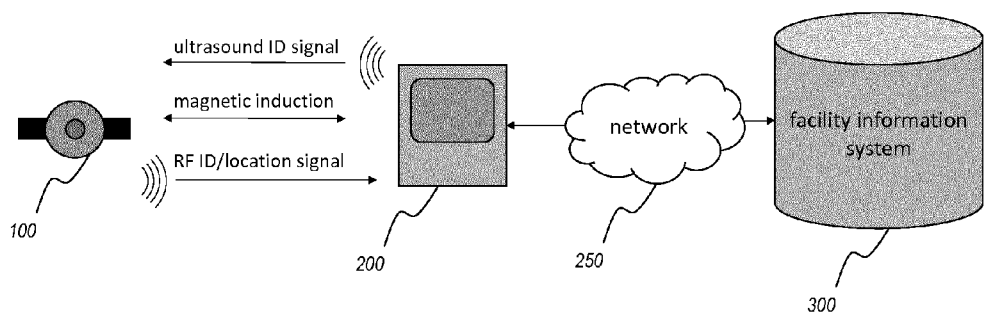
FIG. 1 schematically illustrates a localization system comprising beacons and tags according to an embodiment of the present invention.

FIG. 1 schematically illustrates a location system comprising beacons and tags according to an embodiment of the present invention.

A specific application of the location system described herein is a wireless nurse call system for use in hospitals and other institutions where patients may move about, possibly without being fully conscious of their own exact location. Where appropriate, the invention will be described with reference to such a nurse call system, without intent to limit the scope of the invention to such applications. In the context of a wireless nurse call system, the development of efficient hardware and efficient communication protocols is an important goal, with a view to reducing (battery) power consumption, obtaining a small form factor, and keeping the total cost as low as possible.

In the preferred localisation system, beacons 200 are provided at fixed locations throughout an area in which the location of mobile objects or persons is to be monitored. The beacons may generally be mounted to walls, doors, pillars, and the like. They may have a basic user interface comprising a display and one or more keys.

The beacons emit an identification element, which is preferably modulated onto an ultrasound signal. Ultrasound communication is based on electromechanically induced vibrations that generate propagating longitudinal acoustic waves. As ultrasound waves are, by definition, in a frequency range beyond the audible range for humans, their use is no hindrance to humans present in the monitored area.

Within building environments, ultrasound waves are almost completely blocked by walls (contrary to electromagnetic waves). Ultrasound waves are therefore a suitable signal type to obtain room-level localisation accuracy. With additional processing, even sub-room-level accuracy may be achieved.

However, in the context of the present invention, it is also possible to transmit the beacon signals in other forms, such as low-power RF signals. The power of the RF signals is preferably calibrated in such a way that the probability of any tag receiving such a signal in an adjacent room is virtually zero. In yet another alternative, the beacon signals may be transmitted by means of magnetic induction communication.

The mobile objects or persons to be monitored are provided with identification tags (hereinafter also referred to as "tags") 100, which comprise a receiver for the signals emitted by the beacons 200, i.e., in the case of ultrasound transmission, an ultrasound receiver.

Due to the electromechanical nature of ultrasound transmission and reception processes, these processes consume relatively large amounts of electrical power. As the tags 100 would have to be battery-powered to be sufficiently mobile and preferably even wearable, power consumption is a significant concern. It is an advantage of embodiments of the present invention that the overall power consumption in an ultrasound-based tag system can be reduced, which leads to a longer operational autonomy period and/or smaller form factor for the tags.

Upon receiving the beacon identification element encoded in the (ultrasound) signal, the tag 100 will be aware of its location (in the sense of being able to identify the nearest beacon 200) down to room-level accuracy, without any need for triangulation.

The tag 100 further comprises communication means to relay the decoded beacon identification element, along with its own identity, to the central monitoring system, in the form of a localisation message. The communication means may include a radio frequency (RF) transmitter adapted to wirelessly communicate the information to a beacon (the same beacon whose identification element was received and/or another beacon within radio range), which is in turn preferably connected to a wired or wireless network 250 that allows it to communicate with a centralized management system 300.

The characteristics of the received signal observed by the beacon(s) 200 at which the radio signal of the tag 100 is received provide another clue to the location of the tag 100. More specifically, the localisation message will be received at several beacons 200 with different physical characteristics, including a distance-dependent intensity and delay. Accordingly, the relative signal strengths of the signals received at the respective beacons may be used as an indication of where the localisation signal originated. Additionally or alternatively, other information about the localisation message signals received at the beacons 200, such as their time of arrival, may be used to carry out the localisation of the identification tag 100.

This localisation step is coarser than the ultrasound-based localisation, because the range of an RF transmission with typical properties (e.g., using the legally permitted transmit power in the unlicensed ISM bands at 434 MHz, 2.4, GHz or 5 GHz, or the SRD860 band) will be longer than that of an ultrasound transmission, and will in particular not significantly be constrained by walls. The combination of RF-based localisation at a coarse level and ultrasound-based localisation at a finer level allows for a cellular naming system for the beacons; i.e., the beacon identities transmitted in the ultrasound signal need only be unique within the set of beacons with overlapping ultrasound communication ranges. This allows for a shorter "beacon identity" field to be used in the messages conveyed by the ultrasound signals, which in turn leads to a lower average data rate and thus lower power consumption at the transmitter (beacon) and the receiver (tag).

This localisation mechanism will now be described in more detail with reference to the flow chart provided in FIG. 2. For clarity purposes, this flow chart illustrates steps preferably carried out by the beacons 200 on the left hand side (steps 2010, 2020, and 2030), and steps carried out by the tag(s) 100 on the right hand side (steps 1010, 1020, 1030). The steps shown at the bottom (steps 3010, 3020) are preferably carried out by a centralised management system 300, more particularly by localisation logic present in a location calculation agent which is part of such a centralised management system 300. In the embodiments described below, the characteristics of the received signal that are used to perform coarse localisation will be the RSSI; this is an example chosen for illustrative purposes.

In a first step, the illustrated method comprises using a plurality of beacons 200 to broadcast 2010 beacon messages, each of which comprises an identification element relating to the respective beacon that broadcast the beacon message. The identification element serves as the "source address" of the transmission. Preferably it consists of one byte or less, such that the overall message length can be kept very short.

When such a beacon message is received 1010 by an identification tag 100, the tag will extract 1020 the identification element from said received beacon message, and transmit 1030 information related to the identification element as part of its localisation message. The information related to the identification element may be the complete identification element itself. If the identification elements are assigned to the beacons 200 according to a hierarchical addressing scheme, it may be sufficient if the tag 100 includes the lowest-order part of the identification element in its localisation message.

In a subsequent step, a first set of beacons receives 2020 the localisation message from the identification tag 100. Typically, not all beacons 200 are sufficiently close to the tag 100 to physically receive the localisation message. Those beacons 200 that do receive the localisation message will do so with a distance-dependent intensity level. Thus, the observed RSSI levels associated with a given localisation message provides information about the distance of the tag 100 in question from the respective beacons 200.

As the useful processing of the RSSI information requires comparison of RSSIs observed at different beacons, it is advantageous to assemble this information at a centralised point, where it can be processed by a location calculation agent. Thus, the beacons 200 may be configured to relay 2030 the localisation message (or its relevant part) along with the associated observed RSSI, to such a location calculation agent.

At the location calculation agent, localisation of the tag 100 that transmitted the localisation message is performed 3010 on the basis of the received RSSIs. Additionally, the exact beacon 200 whose beacon message triggered the localisation message in question can be identified 3020 on the basis of the identification element cited in the localisation message. As will be explained below in connection with FIG. 3d, step 3020 can alternatively be carried out by means of message filtering at the individual beacons 200.

FIGS. 3a-3d represent an exemplary layout of an area to be monitored according to the method of the present invention. Without loss of generality, three adjacent cells are shown, each of which contains three beacons 200, which are, in each cell, assigned the respective identification elements "1", "2", and "3". In the illustrated case, and without loss of generality, each beacon 200 is arranged to cover one room. The beacons 200 are connected to a backbone network 250 that allows them to transmit messages to a centralized management system 300 comprising a location calculation agent. Cell boundaries are schematically shown as solid lines. Room boundaries are schematically shown as broken lines.

As is clearly shown, the respective address spaces (i.e., the sets of assigned identification elements) of the beacons in the different cells overlap. This can be allowed because, due to the limited range over which the beacon messages can be received, the tag 100 will not be able to receive beacon messages from more than one beacon with any given identification element. The presence of physical barriers (walls) between the rooms reduces the probability that beacon messages propagate from one room to another. The general layout of the monitored area is such that beacon messages don't propagate from one cell to another. In this way, the address spaces can be kept relatively small.

Figure 3A:
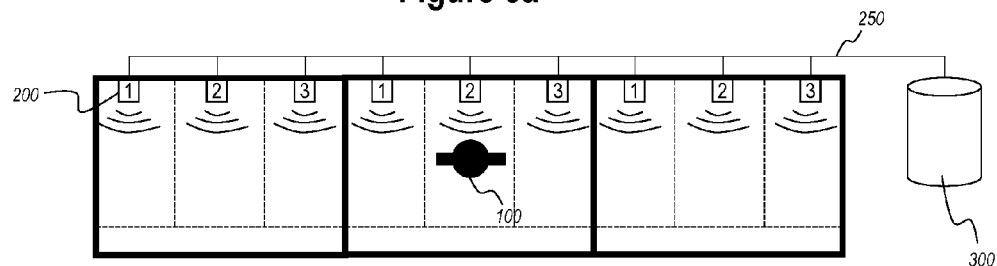
FIGS. 3a-3d schematically illustrate sequences of steps representing embodiments of the present invention.

As shown in FIG. 3a, the beacons 200 initially transmit their beacon messages, preferably by means of ultrasound transmission. While the beacons 200 are illustrated as transmitting simultaneously, the actual transmissions may occur in an alternating fashion by performing time-domain multiplexing, particularly within in one cell. As schematically shown in the Figure, the ultrasound transmission has a short range, and does not cross the boundaries between the cells.

An identification tag 100 is assumed to be present in the middle cell. At any given time, the tag 100 is typically in range of the transmissions of just one beacon 200, due to the limited propagation range of beacon messages and the presence of physical barriers; in the illustrated case, this is beacon "2" of the middle cell. Upon receiving the beacon message, the identification tag 100 will extract the identification element "2" from the beacon message as described above.

Figure 3B:
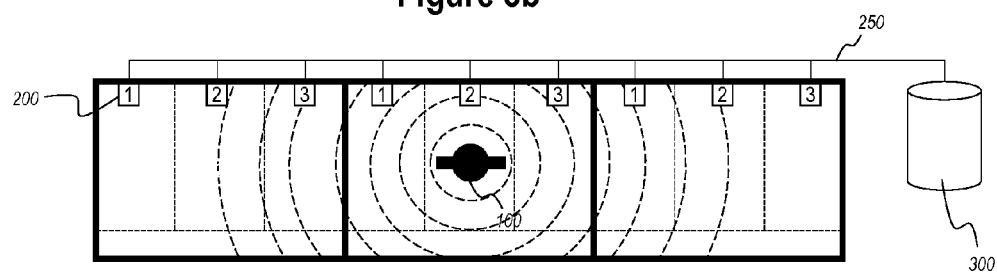

As shown in FIG. 3b, the identification tag 100 will then broadcast its localisation message, including the identification element "2" (or other information representing identification element "2"). This transmission will typically take place by means of radio waves, whose range may extend beyond the boundaries of a single cell. In the illustrated exemplary case, the localisation message is received by beacons "2" and "3" in the left hand cell; beacons "1", "2", and "3" in the middle cell; and beacons "1" and "2" in the right hand cell.

Figure 3C:
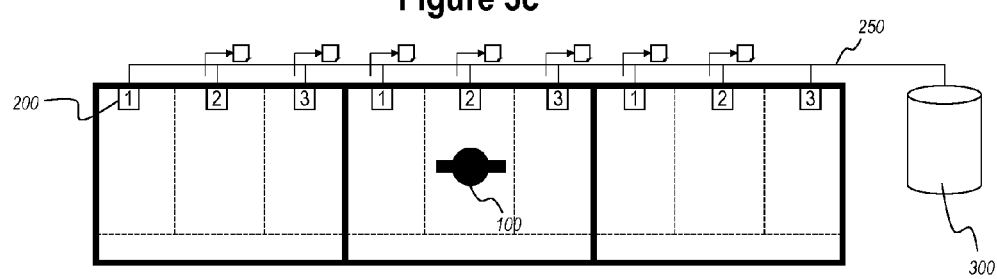

In a first variant, illustrated in FIG. 3c, all the aforesaid beacons 200 that received the localisation message pass on the message along with an indication of the RSSI associated with the message. Upon comparing the RSSI information, the location calculation agent will notice that the RSSI observed at beacons "1", "2", and "3" of the middle cell is higher than that of any other beacons. Accordingly, the location of the transmitting tag can be coarsely determined as being in the middle cell. Meanwhile, the identification element "2" included in the localisation message allows the location calculation agent to further narrow down the location of the transmitting tag to the area covered by the ultrasound signal of beacon "2". This completes the localisation process.

Figure 3D:
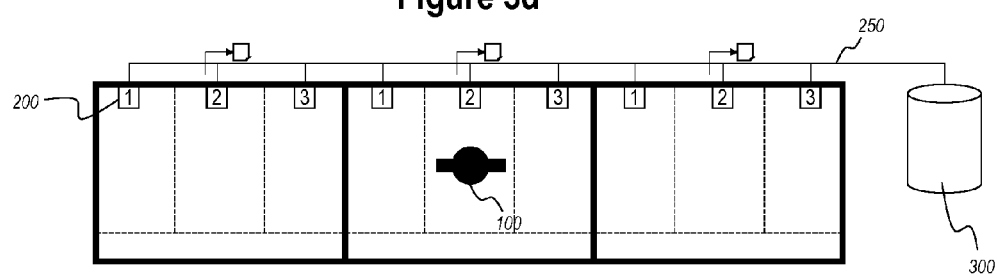

In a second variant, illustrated in FIG. 3d, only those beacons 200 whose identification element corresponds to the one advertised in the localisation message, pass on the message along with an indication of the RSSI associated with the message. In the illustrated example, the location calculation agent will only receive RSSI information from the three beacons with identification element "2" in the respective cells. The location calculation agent will now compare the RSSI associated with each of these beacons, and determine the location of the transmitting tag as the area covered by the ultrasound signal of the beacon where the observed RSSI is the strongest.

The invention also pertains to a system comprising at least one identification tag 100 and a plurality of beacons 200. The plurality of beacons 200 is configured to broadcast beacon messages, each beacon message comprising an identification element relating to the respective beacon that broadcast the beacon message. The identification tag 100 is adapted to: receive a beacon message from among the beacon messages, extract the identification element from the received beacon message, and transmit information related to the identification element as part of the localisation message. The system further comprises localisation logic 300 configured to perform a first level of localisation of the tag on the basis of the relative signal strength of the respective copies of the localisation message received at the first set of beacons; and to perform a second level of localisation of the tag on the basis of the information related to the identification element.

Figure 2:
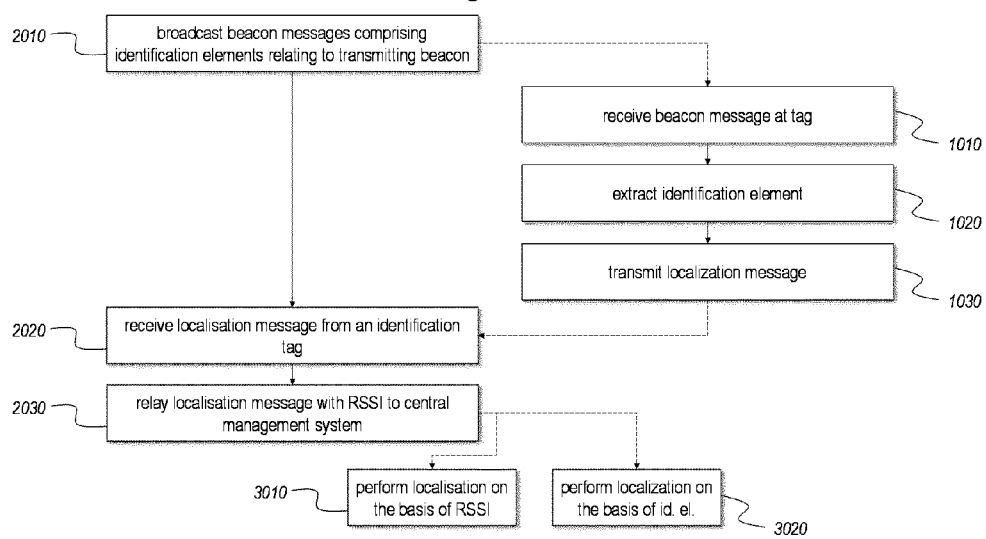
FIG. 2 provides a flow chart of a method according to an embodiment of the present invention.

The operation and advantages of the system are fully explained by the description of FIGS. 1-3 above. The functions described hereinabove as pertaining to the location calculation logic may be implemented in dedicated hardware (e.g., ASIC), configurable hardware (e.g., FPGA), programmable components (e.g., a DSP or general purpose processor with appropriate software), or any combination thereof. The same component(s) may also include other functions.

The present invention also pertains to a computer program, optionally stored on a computer-readable medium, comprising code means adapted to cause a processor to carry out the method described above. In particular, the invention pertains to a computer program, optionally stored on a computer-readable medium, comprising code means adapted to cause a processor to perform steps 3010 and 3020 (i.e., to act as the location calculation agent).

The invention also pertains to a method for installing a system as described above. This method comprises: selecting beacon locations in an area to be monitored; grouping the selected beacon locations into cells such that beacon messages cannot cross cell boundaries; assigning beacon addresses to the selected beacon locations, wherein the beacon addresses are unique within the cells; determining for each one of the cells a minimum address field size required to transmit all beacon addresses occurring in the cell; and positioning beacons at the beacon locations, each one of the beacons being configured to transmit the respective beacon address associated with the beacon location at which it is positioned.

This method allows the installer to find an optimal trade-off between cell size and transmission efficiency. Larger cells will require a larger address space, which results in a longer identification element and hence longer message transmissions. On the other hand, smaller cells can only be achieved if the physical environment can adequately block beacon transmissions from reaching other cells. According to this aspect of the invention, the size of the address space is kept to a minimum. Optionally, the size of the address space can vary between cells.

While the invention has been described hereinabove with reference to specific embodiments, this is done to illustrate and not to limit the invention, the scope of which is defined by the accompanying claims. The skilled person will readily appreciate that different combinations of features than those described herein are possible without departing from the scope of the claimed invention.

The invention claimed is:

1. A method for determining a location of an identification tag in a monitored area, the method comprising:
   using a plurality of beacons to broadcast beacon messages, each beacon message comprising an identification element relating to a respective beacon that broadcast that beacon message;
   receiving at a first set of beacons from among said plurality of beacons a localisation message from said identification tag, said identification tag having (a) received a beacon message from among said beacon messages, (b) extracted said identification element from said received beacon message, and (c) transmitted information related to said identification element as part of said localisation message;
   performing a first level of localisation of said identification tag on the basis of characteristics of respective copies of said localisation message received at said first set of beacons; and
   performing a second level of localisation of said identification tag on the basis of said information related to said identification element, wherein said characteristics comprise relative signal strengths of the respective copies of said localisation message received at said first set of beacons, and wherein a same identification element is assigned to different beacons from among said plurality of beacons which are located at positions for which respective ranges for receiving beacon messages do not overlap.

2. The method according to claim 1, wherein said beacon message is transmitted as an ultrasound message.

3. The method according to claim 2, wherein said localisation message is transmitted as a radio-frequency message.

4. The method according to claim 2, further comprising transmitting said information related to said identification element along with information related to said characteristics from said first set of beacons to a location calculation agent.

5. The method according to claim 4, wherein said transmitting occurs only at selected beacons from among said first set of beacons, said selected beacons being those beacons for which the identification element corresponds to said information related to said identification element.

6. The method according to claim 1, wherein said localisation message is transmitted as a radio-frequency message.

7. The method according to claim 3, further comprising transmitting said information related to said identification element along with information related to said characteristics from said first set of beacons to a location calculation agent.

8. The method according to claim 7, wherein said transmitting occurs only at selected beacons from among said first set of beacons, said selected beacons being those beacons for which the identification element corresponds to said information related to said identification element.

9. The method according to claim 1, further comprising transmitting said information related to said identification element along with information related to said characteristics from said first set of beacons to a location calculation agent.

10. The method according to claim 9, wherein said transmitting occurs only at selected beacons from among said first set of beacons, said selected beacons being those beacons for which the identification element corresponds to said information related to said identification element.

11. A non-transitory computer-readable medium storing machine-executable instructions that, when executed by a processor, cause the processor to perform the method recited in claim 1.

12. A non-transitory computer-readable medium storing machine-executable instructions that, when executed by a processor, cause the processor to perform the method recited in claim 9.

13. A system comprising:
    a plurality of beacons configured to broadcast beacon messages, each beacon message comprising an identification element relating to a respective beacon that broadcast that beacon message;
    at least one identification tag adapted to:
      receive a beacon message from among said beacon messages,
      extract said identification element from said received beacon message, and
      transmit information related to said identification element as part of a localisation message to a first set of beacons from among said plurality of beacons; and
    localisation logic configured to:
      perform a first level of localisation of said at least one identification tag on the basis of characteristics of respective copies of said localisation message received at said first set of beacons, and
      perform a second level of localisation of said at least one identification tag on the basis of said information related to said identification element,
      wherein said characteristics comprise relative signal strengths of the respective copies of said localisation message received at said first set of beacons, and wherein a same identification element is assigned to different beacons from among said plurality of beacons which are located at positions for which respective ranges for receiving beacon messages do not overlap.

14. The system according to claim 13, wherein said plurality of beacons are adapted to transmit said beacon message as an ultrasound message.

15. The system according to claim 14, wherein said at least one identification tag is adapted to transmit said localisation message as a radio-frequency message.

16. The system according to claim 14, further comprising a location calculation agent, wherein said plurality of beacons is further configured to transmit said information related to said identification element along with information related to said characteristics to said location calculation agent.

17. The system according to claim 13, wherein said at least one identification tag is adapted to transmit said localisation message as a radio-frequency message.

18. The system according to claim 17, further comprising a location calculation agent, wherein said plurality of beacons is further configured to transmit said information related to said identification element along with information related to said characteristics to said location calculation agent.

19. The system according to claim 13, further comprising a location calculation agent, wherein said plurality of beacons is further configured to transmit said information related to said identification element along with information related to said characteristics to said location calculation agent.

* * * * *